United States Patent [19]
Saito et al.

[11] Patent Number: 5,566,210
[45] Date of Patent: Oct. 15, 1996

[54] DATA RECEIVING APPARATUS

[75] Inventors: Yoshiko Saito; Mitsuru Uesugi, both of Yokohama, Japan

[73] Assignee: Matsushita Electric Industrial Co., Ltd., Osaka, Japan

[21] Appl. No.: 343,851

[22] Filed: Nov. 17, 1994

[30] Foreign Application Priority Data

Nov. 29, 1993 [JP] Japan ..................... 5-320870

[51] Int. Cl.$^6$ ................. H04L 7/02; H03H 7/30
[52] U.S. Cl. .............. 375/329; 375/233; 375/235; 329/304
[58] Field of Search ................. 375/329, 332, 375/343–344, 233, 235, 279, 281, 283; 329/304, 306–308; 364/724.16, 724.19, 724.2

[56] References Cited

U.S. PATENT DOCUMENTS

| | | | |
|---|---|---|---|
| 4,328,585 | 5/1982 | Monsen | 375/233 |
| 4,873,683 | 10/1989 | Borth et al. | 375/235 |
| 4,888,793 | 12/1989 | Chanroo et al. | 375/330 |
| 5,200,977 | 4/1993 | Ohnishi et al. | 375/235 |
| 5,257,265 | 10/1993 | Su et al. | 375/233 |
| 5,274,670 | 12/1993 | Serizawa et al. | 375/233 |
| 5,367,536 | 11/1994 | Tsujimoto | 375/233 X |

FOREIGN PATENT DOCUMENTS

| | | |
|---|---|---|
| 0551081A2 | 7/1993 | European Pat. Off. . |
| 3-175748 | 7/1991 | Japan . |

OTHER PUBLICATIONS

IEEE Journal of Selected Areas in Communication, vol. 11, No. 7, Sep. 1993, New York, US, pp. 1034–1045 Yow–Jong Liu et al. "A soft–output bidirectional decision feedback equalization technique for TDMA cellular radio".

*Primary Examiner*—Young T. Tse
*Attorney, Agent, or Firm*—Rossi & Associates

[57] ABSTRACT

A data receiving apparatus includes: a receiving portion for receiving a QPSK (PSK, GMSK) signal using a local oscillation signal; a forward (FWD) equalizing portion for effecting a FWD equalization to the PSK signal using FWD tap coefficients, including a FWD main tap coefficient, successively renewed; a backward equalizing portion for effecting a backward equalization to the PSK signal using backward tap coefficients, including a backward main tap coefficient, successively renewed; and a prediction portion for predicting a phase difference between a carrier frequency of the PSK signal and the local oscillation frequency according to the FWD and backward main tap coefficients. In this apparatus, the FWD and backward equalizing portions effect FWD and backward equalizing training processings using the sync word in the PSK signal in the FWD and backward directions to determine the FWD and backward tap coefficients before FWD and backward equalizations respectively. It may further include a correction portion for compensating a phase difference in outputs of the FWD and backward equalizing portions according to the predicted phase difference. The local oscillation frequency is controlled according to the predicted phase difference.

10 Claims, 6 Drawing Sheets

DATA RECEIVING APPARATUS

BACKGROUND OF THE INVENTION

1. Field of the Invention

This invention relates to a data receiving apparatus for receiving data and particularly to a data receiving apparatus used for a digital mobile unit communication with a phase correction.

2. Description of the Prior Art

A data receiving apparatus used for a digital mobile unit communication with a phase correction is known. In such data receiving apparatus, a phase shift keying (PSK) method is used. In the phase shift keying method, for example, data "1" is transmitted by advancing a phase of a carrier signal and data "–1" is transmitted by delaying the phase of the carrier signal. In the phase shift keying method, the carrier signal is given by:

$$E(t)=Ecos\,(\omega_o t+\theta(t))$$

where $\omega_o$ is a frequency of the carrier signal.

In the quadri phase shift keying method (QPSK), at least four kinds of data is transmitted through combination of data represented by phase shifting two carriers having a phase difference of $\pi/2$ each other.

If there is no phase difference between an oscillation frequency used for transmitting the carrier signal on the transmission side and the oscillation frequency used for demodulation on the receiving side, and in-phase component(real number component) Ri and quadrature component(imaginary number component) Rq are given by:

$$\begin{aligned}Ri(t) &= Ecos(\omega_o t+\theta(t))\times\sin\omega_o t\\ &= 1/2\times Ecos\,\theta(t)+1/2\times Ecos(2\,\omega_o t+\theta(t))\\ Rq(t) &= Ecos(\omega_o t+\theta(t))\times\cos\omega_o t\\ &= 1/2\times Esin\,\theta(t)+1/2\times Esin(2\,\omega_o t+\theta(t)).\end{aligned}$$

wherein each of the second terms are suppressed by a low-pass filters. Therefore, these equations are rewritten by:

$$Ri(t)=\tfrac{1}{2}\times Ecos\theta(t)$$

$$Rq(t)=\tfrac{1}{2}\times Esin\theta(t).$$

A data receiving apparatus employing this method judges that $\theta(t)$ is equal to 0, $\pi/2$, $\pi$, or $-\pi/2\,\pi$, so that a symbol is decoded in accordance with the combinations of the in-phase component Ri(t) and the quadrature component Rq (t), namely, (E/2, 0), (0, E/2), (–E/2, 0) and (0, –E/2) are discriminated.

When there is a constant frequency difference $\omega_d$ between the transmission and receiving sides, the received signal is represented by:

$$\begin{aligned}Ri(t) &= Ecos(\omega_o t+\theta(t))\times\cos(\omega_o+\omega_d)t\\ &= 1/2\times Ecos(\theta(t)-\omega_d t)+1/2\times\\ &\quad Ecos(2\,\omega_o t+\omega_d t+\theta(t))\\ Rq(t) &= Ecos(\omega_o t+\theta(t))\times\sin(\omega_o+\omega_d)t\\ &= 1/2\times Esin(\theta(t)-\omega_d t)+1/2\times\\ &\quad Esin(2\,\omega_o t+\omega_d t\theta(t)).\end{aligned}$$

wherein the second terms are suppressed by low-pass filters. Therefore, they are given by:

$$Ri(t)=\tfrac{1}{2}\times Ecos(\theta(t)-\omega_d t)$$

$$Rq(t)=\tfrac{1}{2}\times Esin(\theta(t)-\omega_d)t$$

As mentioned above, when there is a difference between the carrier frequency on the transmission side and a signal for demodulating on the receiving side, there is a phase difference represented by a linear expression in the received signal. Therefore, the data receiving apparatus is required to predict this linear expression and to correct the phase difference before discrimination of the received data.

FIG. 7 shows a graph of a phase error line used in the prior art data receiving apparatus. This linear expressing is represented by a slant line when phase changes ($\theta(t)-\omega_d t$) are plotted at the first quadrant from symbols sequentially received irrespective of quadrants. This line phase error line can be predicted by calculation of square means error from respective plotted points.

The phase correction corresponds to rotating respective plotted points by an angle corresponding to the slant angle of the phase error line toward X coordinate. After this phase correction, data represented by the plotted points are discriminated.

FIG. 8 is a block diagram of such a prior art data receiving apparatus. The prior art data receiving apparatus comprises an equalizing portion 132 for equalizing the received signal from an input terminal 131 to remove a distortion or the like, a memory 133 for storing the received signal from the equalizing portion 132, a phase characteristic predicting portion 134 for predicting the phase error line from a phase difference in the output signal of the equalizing portion 132, a correction portion 135 for correcting the phase difference in the output signal of the equalizing portion 132 using a rotation angle for correction determined by the slant angle of the phase error line, and a discrimination portion 136 for discriminating data represented by the phase corrected received signal to output a discrimination result from an output terminal 137.

FIG. 9 shows a flow chart representing an operation of this prior art data receiving apparatus.

In step s1, when the received signal is inputted to the input terminal 131, the equalizing portion 132 effects equalizing processing and outputs an equalized output signal. In the following step s2, the output of the equalizing portion 132 is stored in the memory 133. In the following step s3, the phase characteristic predicting portion 134 predicts a phase error line in accordance with the phase difference successively obtained in the output signal of the equalizing portion 132. In the following step s4, the phase characteristic predicting portion 134 supplies an inclination of the phase error line to the equalizing output correcting portion 135, the equalized output correcting portion 135 determines a correction angle for correcting the phase difference of the equalized output signal.

In the following step s5, the equalized output correction portion 135 corrects the phase of the equalized output signal read from the memory 133 by the correction angle, and supplies a corrected equalized output signal successively to the discrimination portion 136.

In step s6, the discrimination portion 136 discriminates the compensated equalized output into multi-values of the transmitted data and outputs the discriminating result from the output terminal 137.

As mentioned above, the prior art data receiving apparatus determines the phase error line representing phase errors from the equalized output signal, corrects the equalized output signal with the rotation angle for correction obtained by the inclination of the phase error line, and then, effects decoding.

However, there is a problem that it is very difficult to provided a high speed data processing in response to the data input because an amount of operation for presuming the phase difference between the transmission and receiving sides is extremely large.

SUMMARY OF THE INVENTION

The aim of the present invention is to provide an improved data receiving apparatus.

According to the present invention there is provided a first data receiving apparatus comprising: a receiving portion for receiving a phase shift keying signal using a local oscillation signal; a forward equalizing portion for effecting a forward equalization to the phase shift keying signal using forward tap coefficients, including a forward main tap coefficient, successively renewed; a backward equalizing portion for effecting a backward equalization to the phase shift keying signal using backward tap coefficients, including a backward main tap coefficient, successively renewed; and a prediction Portion for predicting a phase difference between a carrier frequency of the phase shift keying signal and a frequency of the local oscillation signal in accordance with the forward main tap coefficient and the backward main tap coefficient.

In the first data receiving apparatus, the phase shift keying signal transmitting a data train repeatedly, each data train having first data, a synchronizing word, and second data successively, the forward equalizing portion effects a forward equalizing training processing using the synchronizing word in the forward direction with respect to time passage in receiving the data train to determine the forward tap coefficients before equalizing the second data, and the backward equalizing portion effects a backward equalizing training processing using the synchronizing word in the backward direction with respect to time passage in receiving the data train to determine the backward tap coefficients before equalizing the first data.

The first data receiving apparatus may further comprise a correction portion for compensating a phase difference in outputs of the forward and backward equalizing portions in accordance with the predicted phase difference.

The first data receiving apparatus may further comprise a frequency control portion for controlling the frequency of the local oscillation frequency in accordance with the predicted phase difference.

According to the present invention there is also provided a second data receiving apparatus comprising: a receiving portion for receiving a phase shift keying signal using a local oscillation signal; a forward equalizing portion for equalizing a phase shift keying signal repeatedly transmitting data train, the forward equalizing portion having a first memory for storing and outputting the data train in a forward direction with respect to time passage in receiving of the data train, a first delay portion for successively delay the phase shift keying signal to obtain first current component and first successively delayed components, a first weighting portion for weighting the first current and first delayed components with forward tap coefficients, and a first adding portion for adding outputs of the weighting portion; a forward tap coefficient renewing portion for renewing the forward tap coefficients such that a first error in an output of the first adding portion becomes a first minimum value and outputting one of forward tap coefficients which is used by the weighting portion for weighting the first current component; a backward equalizing portion for equalizing the phase shift keying signal, the backward equalizing portion having a second memory for storing and outputting the data train in a backward direction with respect to time passage in receiving of the data train, a second delay portion for successively delay the phase shift keying signal to obtain a second current component and second successively delayed components, a second weighting portion for weighting the second current and second delayed components with backward tap coefficients, and a second adding portion for adding outputs of the second weighting portion; a backward tap coefficient renewing portion for renewing the backward tap coefficients such that a second error in an output of the second adding portion becomes a second minimum value and outputting one of backward tap coefficients which is used by the second weighting portion for weighting the oldest delayed component; and a phase difference prediction portion for predicting a phase difference between a carrier frequency of the phase shift keying signal and a frequency of the local oscillation signal.

In the second data receiving apparatus, the data train includes first data, a synchronizing word, and second data successively, the forward equalizing portion effects a forward equalizing training processing such that the first memory outputs the synchronizing word and the second data in the forward direction to determine the forward tap coefficients by the forward tap coefficient renewing portion before equalizing the second data, and the backward equalizing portion effects a backward equalizing training processing such that the second memory outputs the synchronizing word and the first data in the backward direction to determine the backward tap coefficients by the backward tap coefficient renewing portion before equalizing the first data.

The second data receiving apparatus may further comprise a correction portion for correcting a phase difference in outputs of the forward and backward equalizing portions in accordance with the predicted phase difference.

The second data receiving apparatus may further comprise a frequency control portion for controlling the frequency of the local oscillation frequency in accordance with the predicted phase difference.

According to the present invention there is also provided a third data receiving apparatus comprising: a receiving portion for receiving a gaussian-filtered minimum shift keying signal using a local oscillation signal; a forward equalizing portion for effecting a forward equalization to the gaussian-filtered minimum shift keying signal using forward tap coefficients, including a forward main tap coefficient, successively renewed; a backward equalizing portion for effecting a backward equalization to the gaussian-filtered minimum shift keying signal using backward tap coefficients, including a backward main tap coefficient, successively renewed; and a prediction portion for predicting a phase difference between a carrier frequency of the gaussian-filtered minimum shift keying signal and a frequency of the local oscillation signal in accordance with the forward main tap coefficient and the backward main tap coefficient.

In the third data receiving apparatus, more specifically, the gaussian-filtered minimum shift keying signal carries a data train repeatedly, each data train having first data, a synchronizing word, and second data successively, the forward equalizing portion effects a forward equalizing training processing using the synchronizing word in the forward direction with respect to time passage in receiving the data train to determine the forward tap coefficients before equalizing the second data, and the backward equalizing portion effects a backward equalizing training processing using the synchronizing word in the backward direction with respect to time passage in receiving the data train to determine the backward tap coefficients before equalizing the first data.

In the third data receiving apparatus may further comprise a correction portion for compensating a phase difference in outputs of the forward and backward equalizing portions in accordance with the predicted phase difference.

In the third data receiving apparatus may further comprise a frequency control portion for controlling the frequency of the local oscillation frequency in accordance with the predicted phase difference.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
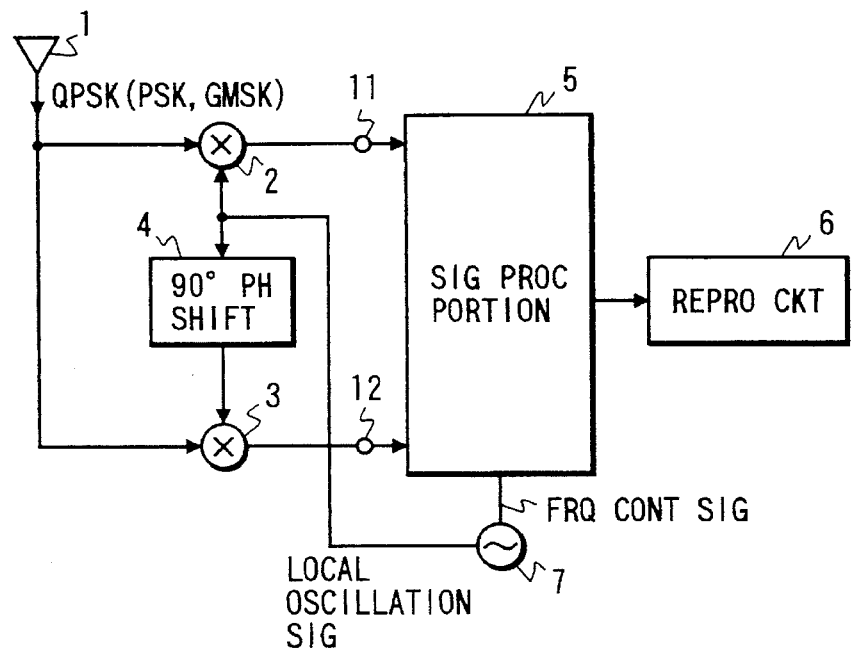
FIG. 1 is a general block diagram of an embodiment of a mobile station.

FIG. 1 is a general block diagram of the embodiment of a mobile station. A transmitted quadrature phase shift keying signal is received by an antenna 1. The received quadrature phase shift keying signal is supplied to mixers 2 and 3. The mixer 2 mixes the received quadrature phase shift keying signal with a local oscillation signal to detect an in-phase component of the phase shift keying signal. The mixer 3 supplies a quadrature component phase shift keying signal to a signal processing circuit 5 comprising a digital signal processor (DSP) including a microprocessor. The local oscillation signal is 90°-phase shifted by a phase shifter 4. The mixer 3 mixes the received quadrature phase shift keying signal with the 90° phase shifted local oscillation signal to detect a quadrature component of the phase shift keying signal. The mixer 3 supplies the quadrature component of the phase shift keying signal to a signal processing circuit 5. The signal processing circuit 5 processes the in-phase and quadrature components of the phase shift keying signal and supplies a processed signal to a reproducing circuit 6 to reproduce a received signal as a sound signal for example. This system is used as a potable telephone system for example. The signal processing circuit 5 also supplies a frequency control signal to a local oscillation circuit 7 which produces the local oscillation signal.

Figure 2:
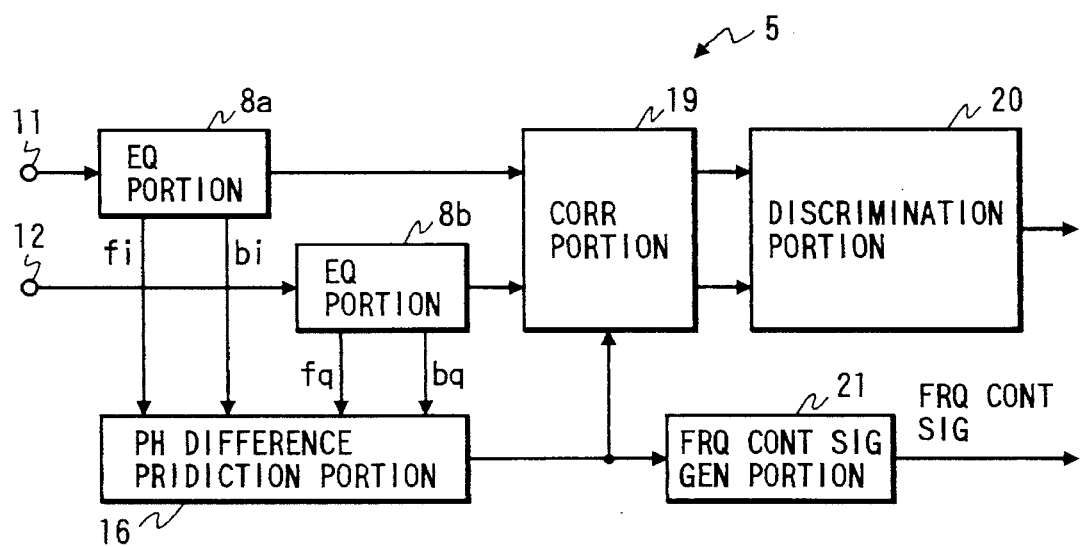
FIG. 2 is a block diagram of this embodiment of the signal processing circuit shown in FIG. 1.

FIG. 2 is a block diagram of this embodiment of the signal processing circuit 5 shown in FIG. 1.

The signal processing circuit 5 comprises equalizing portions 8a and 8b for equalizing in-phase component (1) and quadrature component (q) of the phase shift keying signal and producing forward and backward main tap coefficients respectively; a phase difference prediction portion 16 for producing a phase correction signal from the forward and backward main tap coefficients; a correction portion 19 for phase correcting the equalized signals from the equalizing portions 8a and 8b using the phase correction signal; a discrimination portion 20 for discriminating outputs of the correction portion between a mark and a space to be discriminated; and a frequency control signal generation portion 21 for generating the frequency control signal supplied to the local oscillation circuit 7.

Figure 8:
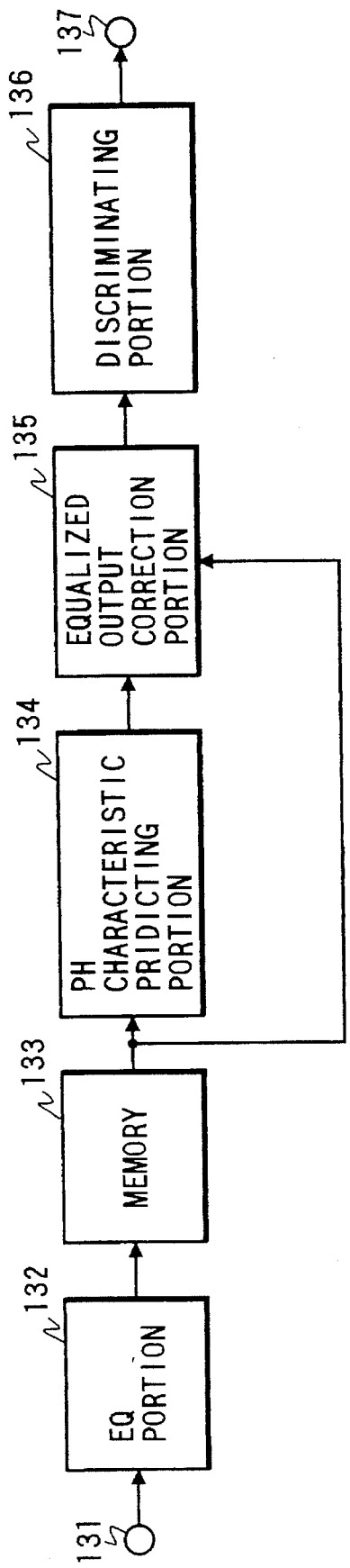
FIG. 8 is a block diagram of the prior art data receiving apparatus.

The in-phase and quadrature components of the quadrature phase shift keying signal from the mixers 2 and 3 are supplied to the equalizing portions 8a and 8b respectively. The equalizing portion 8a supplies the equalized signal to the correction portion 19 and forward and backward main tap coefficients fi and bi to the phase difference prediction portion 16. The equalizing portion 8b supplies the equalized signal to the correction portion 19 and forward and backward main tap coefficients fq and bq to the phase difference prediction portion 16. The phase difference prediction portion 16 supplies the phase correction signal from the forward and backward main tap coefficients to the correction portion 19 and the frequency control signal generation circuit 21. The correction portion 19 effects phase correcting the equalized signals from the equalizing portions 8a and 8b using the phase correction signal as similar to the prior art correction portion shown in FIG. 8. The discrimination portion 20 discriminates the transmitted phase shift keying signal between a mark and a space included in the transmitted phase shift keying signal using the outputs of the correction portion 19.

Figure 3:
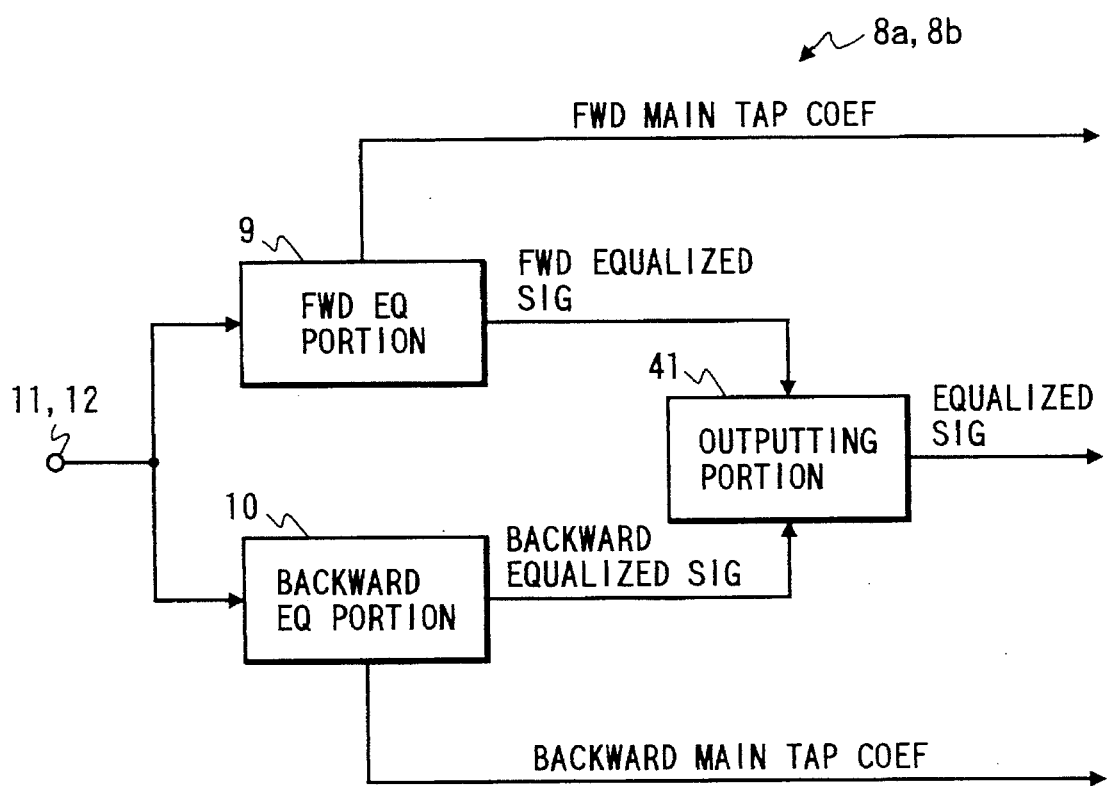
FIG. 3 is a block diagram of this embodiment of the equalizing portions shown in FIG. 2.

FIG. 3 is a block diagram of this embodiment of the equalizing portions 8a and 8b shown in FIG. 2. The equalizing portion 8a comprises: a forward equalizing portion 9 for equalizing the in-phase component or quadrature component from the mixer 2 or 3 through a forward equalizing training processing and a forward equalizing processing to produce a forward equalized signal and forward main tap coefficients; a backward equalizing portion 10 for equalizing the in-phase or quadrature component from the mixer 2 or 3 through a backward equalizing training processing and a backward equalizing processing to produce a backward equalized signal and backward main tap coefficients; and an outputting circuit 41 for outputting the forward equalized signal and the backward equalized signal sequentially in a regular order. The forward main tap coefficients and the backward main tap coefficients of in-phase and quadrature components are supplied to the phase difference prediction portion 16.

The equalizing portion 8b has the same structure as the equalizing portion 8a and equalizing the quadrature component and supplies forward and backward main tap coefficients of the quadrature component to the phase difference prediction portion 16.

Figure 5:
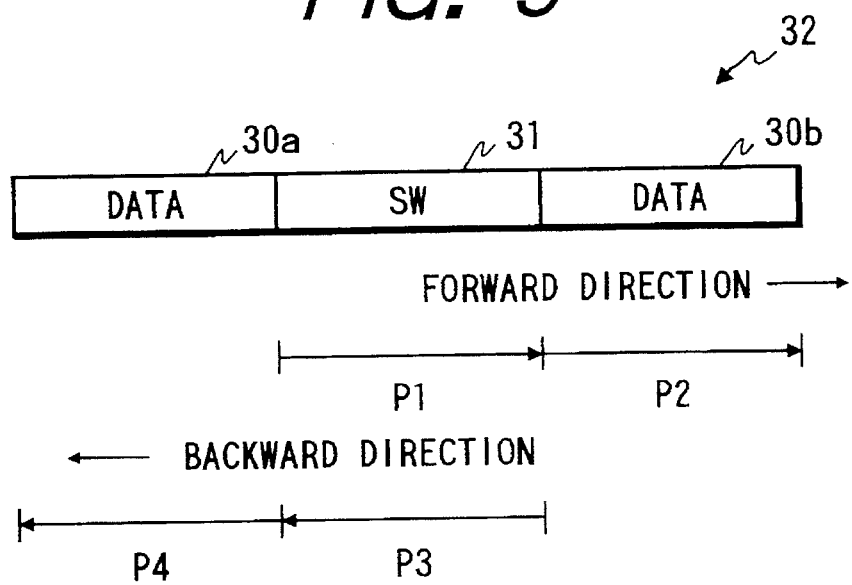
FIG. 5 shows an illustration of this embodiment showing data train carried by the phase shift keying signal and the forward and backward equalizing processings.

FIG. 5 shows an illustration of this embodiment showing data train of the phase shift keying signal and the forward and backward equalizing processings.

The quadrature phase shift keying signal from the mixer 2 or 3 is inputted into the forward equalizing portion 9 and the backward equalizing portion 10 of the equalizing portion 8a or 8b. The phase shift keying signal includes data trains 32 transmitted repeatedly, each data train having data 30a, a synchronizing word 31, and data 30b successively. The forward equalizing portion 9 effects a forward equalizing training processing p1 to determine the forward tap coefficients for equalizing processing using the synchronizing word 31 in the forward direction with respect to passage of time as shown and then, effects a forward equalizing processing p2 to the data 30b using the determined forward tap coefficients. The backward equalizing portion 10 effects a backward equalizing training processing p3 to determine backward tap coefficients for equalizing processing using the synchronizing word 31 in the backward direction with respect to passage of time as shown and then, effects a backward equalizing processing p4 to the data 30a using the determined backward tap coefficients.

Figure 4:
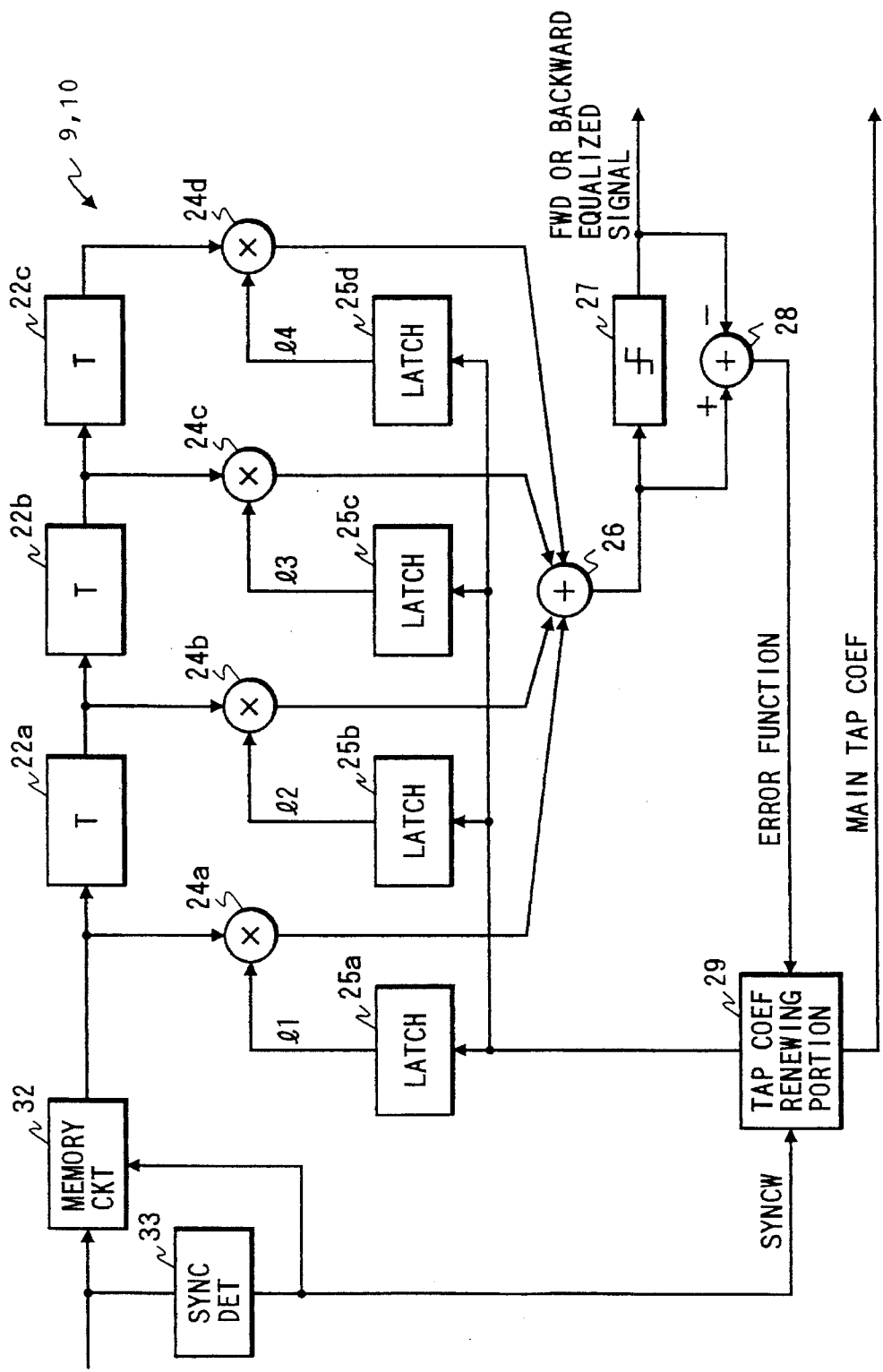
FIG. 4 is a block diagram of this embodiment of the forward and backward equalizing portions shown in FIG. 3.

FIG. 4 is a block diagram of this embodiment of the forward and backward equalizing portions.

The forward equalizing processing portion 9 and backward equalizing processing portion 10 have the similar structure. Each of the forward and backward equalizing portions 9 and 10 comprises a memory 32 for temporary storing in-phase component or the quadrature component; a synchronizing detection portion 33 for detecting a synchronizing word; a plurality of shift registers 22a to 22c for successively delaying the data from the memory 32 to provide current data and past data; a plurality of multipliers 24a to 24d for multiplying a plural of tap coefficients 1 1 to 1 4 by the current and past data respectively; an adder 26 for adding outputs of the multipliers 24a to 24d; a limiter 27 for limiting an output of the adder 26; a subtractor 28 for subtracting the output of the limiter 27 from the output of the adder 26 to produce an error function e; a tap renewing portion 29 for supplying tap coefficients to latches 25a to 25d; the latches 25a to 25d supplies the tap coefficients 1 1 to 1 4 to the multipliers 24a to 24d respectively, the tap coefficient renewing portion 29 producing the tap coefficients in response to the detected synchronizing word such that a sum of square of respective predicted errors is suppressed to a minimum value successively and supplying a main tap coefficient to the phase difference prediction portion 16. In the forward processing, the coefficient 1 1 multiplied by the recent data is supplied to the phase difference prediction portion 16 as the main tap which passing the main electromagnetic wave from the received electronic waves from tile mixer 2 or 3.

The forward equalizing processing portion 9 and backward equalizing processing portion 10 have the similar structure as mentioned. However, the memory 32 of the forward equalizing portion 9 is controlled to output the synchronizing word 31 and the data 30b in the forward direction as shown in FIG. 5 in response to a synchronizing word detected by synchronizing detection portion 33. On the other hand, the memory 32 of the backward equalizing portion 10 is controlled to output the synchronizing word 31 and the data 30a in the backward direction as shown in FIG. 5 in response to the synchronizing word detected by the synchronizing detection portion 33.

More specifically, the synchronizing word 31 includes a predetermined data pattern to provide synchronizing information. In the forward direction processing, the synchronizing word 31 is read from the memory 32 from the top of the synchronizing word in the forward direction to determine the forward tap coefficients and the forward main tap coefficient. At the end of the reading of the synchronizing word 31, the tap coefficient renewing portion 29 of the forward equalizing portion 9 outputs a tap coefficient to be multiplied by the most recent data of the synchronizing word as the forward main tap coefficient. Then, the data 30b is read in the forward direction successively to be equalized to remove distortion in the received phase shift keying signal.

In the backward direction processing, the synchronizing word 31 is read from the memory 32 from the end of the synchronizing word in the backward direction and then, the data is read in the backward direction from the end of the data portion 30 successively as shown and the tap coefficient renewing portion 29 of the backward equalizing portion 10 outputs a tap coefficient to be multiplied by the oldest data of the synchronizing word as the backward main tap coefficient. Then, the data 30a is read in the backward direction successively to be equalized to remove distortion in the received phase shift keying signal.

The phase difference prediction portion 16 predicts the phase difference from the final forward main tap coefficients fi (in-phase component) and fq (quadrature component) and the final backward main tap coefficients bi (in-phase component) and bq (quadrature component).

The calculation of the phase difference will be described.

It is assumed that the in-phase component (real number component) is represented in the x coordinate and the quadrature component (imaginary number component) is represented in the y coordinate. In the x and y coordinates, the final forward main tap coefficient f (fi, fq) which is determined at the end of the synchronizing word (equalizing training processing) is plotted at a point providing a phase angle $\theta_1 (= \tan^{-1}(fq/fi))$. This $\theta_1$ represents the phase relation between the local oscillation frequency and the carrier frequency at the end of the forward equalizing training processing.

On the other hand, the final backward main tap coefficient b (bi, bq) is plotted at a point providing a phase angle $\theta_2 (= \tan^{-1}(bq/bi))$. This $\theta_2$ represents the phase relation between the local oscillation frequency and the carrier frequency at the end of the backward equalizing processing.

If there is no phase difference between the carrier frequency and the local oscillation frequency, $\theta_1 = \theta_2$. If $\theta_1 \neq \theta_2$, it is possible to predict the phase difference from an angle $\theta$ fq corresponding to a difference between $\theta_1$ and $\theta_2$.

The angle $\theta$ fq is an angle between a line between the point f(fi, fq) and the original point of the coordinates and a line between the point b(bi, bq) and can be obtained by normalizing fq, fi, bi, and bq through Eq. 1:

$$\begin{vmatrix} bi & -bi \\ bq & bi \end{vmatrix} \begin{vmatrix} fq \\ fi \end{vmatrix} = \begin{vmatrix} bi \times fq - bq \times fi \\ bq \times fq + bi \times fi \end{vmatrix}$$

$$\theta fq = \tan^{-1}((bi \times fq - bq \times fi)/(bq \times fq + bi \times fi)) \quad (1)$$

The phase difference prediction portion 16 effects the operation represented by Eq. 1 using the forward and backward main tap coefficients fi and bi of the in-phase component from the equation portion 8a and the forward and backward main tap coefficients fq and bq of the quadrature component from the equation portion 8b to obtain a prediction result. The prediction result of the phase difference is supplied to the correction portion 19 and the frequency control signal generation portion 21. The correction portion 19 effects a necessary correction to equalized data to remove the phase difference in the received data. The frequency control signal generation portion 21 generates a frequency control signal from the prediction result to control the local oscillation frequency of the local oscillation circuit 7 to agree it with the carrier frequency using the following equation:

ωd'=θ/the number of bits referenced×½π×data rate     (2)

The discrimination portion 20 judges that θ(t) is equal to 0, π/2, π, or −π/2π, so that a symbol is decoded in accordance with the combinations of the in-phase component and the quadrature component, namely, (E/2, 0), (0, E.2), (−E/2,0) and (0, −E/2) in these components are discriminated.

As mentioned above, the phase difference the transmission and receiving sides, i.e., the carrier frequency and the local oscillation frequency, using the main tap coefficients obtained during the equalizing training processing. Therefore, a circuit scale or a program scale for predicting the phase difference can be reduced, so that an amount of operation and an interval necessary for predicting the phase difference is extremely reduced.

In the above mentioned embodiment, the equalizing portions 8a and 8b effect the forward equalizing training processing and the backward equalizing training processing. However, it is also possible that the equalizing portions 8a and 8b only effect the forward equalizing processing and backward equalizing processing without the forward equalizing training processing and the backward equalizing training processing. In this case, the tap coefficients are initially set to predetermined values and renewed by processing the obtained equalized data. Here, an accuracy of prediction of the phase difference obtained from the main taps using the equalizing training processing is higher than that using the equalizing processing without equalizing training processing.

Figure 6:
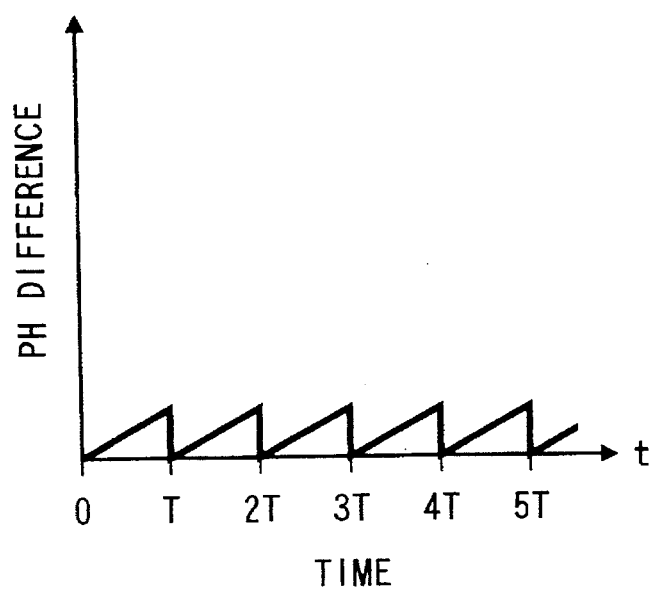
FIG. 6 shows a phase difference variation of this embodiment.
Figure 7:
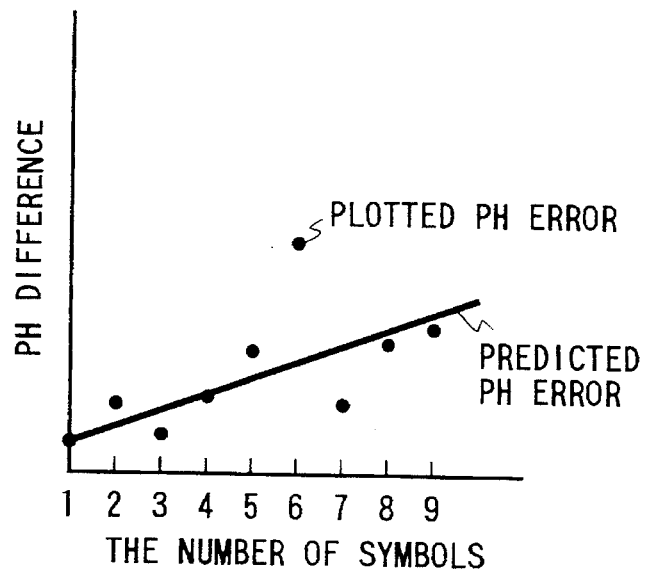
FIG. 7 shows a graph of a phase error line used in the prior art data receiving apparatus.
Figure 9:
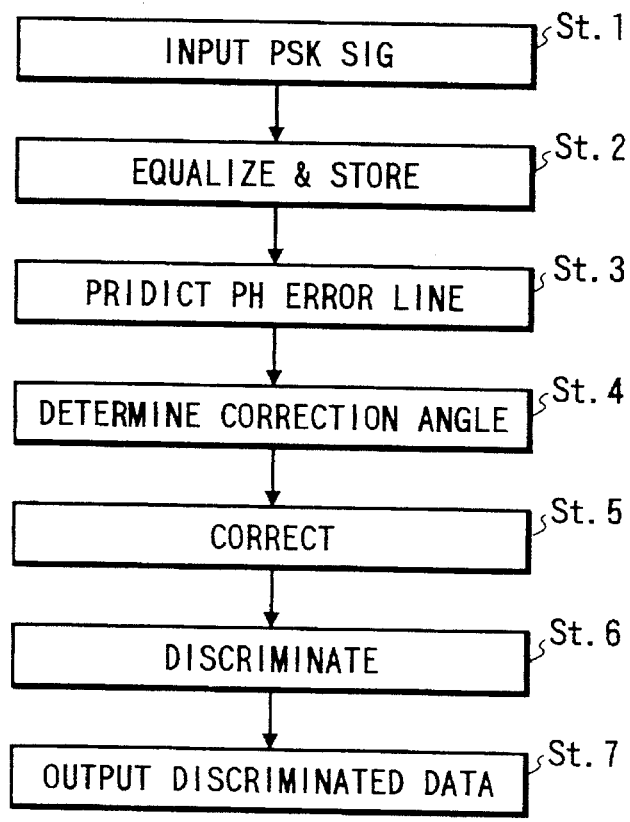
FIG. 9 shows a flow chart representing an operation of the prior art data receiving apparatus.

If the controlling of the local oscillation frequency is effected, the correction by the correction portion 19 can be omited. Moreover, it is not necessary to control the frequency of the local oscillation signal frequently. In this case the correction of by the correction portion 19 may be effected between two consecutive operations of controlling of the local oscillation frequency. FIG. 6 shows a phase difference variation of this embodiment. The correction by the correction portion 19 is effected every interval T, so that the phase difference between the carrier signal and the local oscillation signal is corrected periodically.

In the above mentioned embodiment, the equalizing processing, the phase difference predicting, and the correcting processing are effected to the quadri phase shift keying signal (QPSK). However, this invention is also applicable to the phase shift keying (PSK) signal and gaussian-filtered minimum shift keying (GMSK) signal. In such a case, in FIG. 1, the antenna 1 receives a transmitted phase shift keying signal or gaussian-filtered minimum shift keying (GMSK) signal and supplies the received signal to the mixers 2 or 3. The operation in the signal processing portion 5 is the similar to this embodiment except the operation in the discrimination portion 20 which is well known.

What is claimed is:

1. A data receiving apparatus comprising:
a receiving portion for receiving a phase shift keying signal or a gaussian-filtered minimum shift keying signal using a local oscillation signal and generating an in-phase signal and a quadrature signal;
a first equalizing portion for receiving said in-phase signal and a second equalizing portion for receiving said quadrature signal, each of said first and second equalizing portions including:
a forward equalizing portion for forward-equalizing said in-phase signal or said quadrature signal received using forward tap coefficients, including a forward main tap coefficient, successively renewed;
a backward equalizing portion for backward-equalizing said in-phase signal or said quadrature signal received using backward tap coefficients, including a backward main tap coefficient, successively renewed; and
an outputting portion for outputting an equalized signal from outputs of said forward equalizing portion and said backward equalizing portion; and
a prediction portion for predicting a phase difference between a carrier frequency of said phase shift keying signal or said gaussian-filtered shift keying signal and a frequency of said local oscillation signal in accordance with said forward main tap coefficients and said backward main tap coefficients from said first and second equalizing portions.

2. A data receiving apparatus as claimed in claim 1:
wherein said phase shift keying signal repeatedly carries a data train;
wherein said forward equalizing portion comprises:
a first memory for storing and outputting said data train, included in said received in-phase signal or said received quadrature signal, in a forward direction with respect to time passage in receiving of said data train;
a first delay portion for successively delaying said stored data to obtain a first current component and first successively delayed components;
a first weighting portion for weighting said first current and first delayed components with forward tap coefficients;
a first adding portion for adding outputs of said weighting portion;
a forward tap coefficient renewing portion for renewing said forward tap coefficients such that a first error in an output of said first adding portion becomes a first minimum value and outputting one of forward tap coefficients which is used by the first weighting portion for weighting said current component as said forward main tap coefficient; and
wherein said backward equalizing portion comprises:
a second memory for storing and outputting said data train, included in said received in-phase signal or said received quadrature signal, in a backward direction with respect to time passage in receiving of said data train;
a second delay portion for successively delaying said stored data to obtain a second current component and second successively delayed components;
a second weighting portion for weighting said second current and second delayed components with backward tap coefficients;
a second adding portion for adding outputs of said second weighting portion;
a backward tap coefficient renewing portion for renewing said backward tap coefficients such that a second error in an output of said second adding portion becomes a second minimum value and outputting one of backward tap coefficients which is used by the second weighting portion for weighting an oldest delayed component as said backward main tap coefficient.

3. A data receiving apparatus as claimed in claim 2, further comprising a correction portion for compensating a phase difference in said equalized signals from said outputting portions of said first and second equalizing portions in accordance with said predicted phase difference.

4. A data receiving apparatus as claimed in claim 2, wherein said data train includes first data, a synchronizing word, and second data successively, said forward equalizing portion effects a forward equalizing training processing such that said first memory outputs said synchronizing word and said second data in the forward direction to determine said forward tap coefficients by said forward tap coefficient renewing portion before equalizing said second data, and said backward equalizing portion effects a backward equalizing training processing such that said second memory outputs said synchronizing word and said first data in the backward direction to determine said backward tap coefficients by said backward tap coefficient renewing portion before equalizing said first data.

5. A data receiving apparatus as claimed in claim 4, further comprising a correction portion for compensating a phase difference in said equalized signals from said outputting portion of said first and second equalizing portions in accordance with said predicted phase difference.

6. A data receiving apparatus as claimed in claim 2, further comprising a frequency control portion for controlling said frequency of said local oscillation frequency in accordance with said predicted phase difference.

7. A data receiving apparatus as claimed in claim 1, further comprising a correction portion for compensating a phase difference in said equalized signals from said outputting portion of said first and second equalizing portions in accordance with said predicted phase difference.

8. A data receiving apparatus as claimed in claim 1, wherein said phase shift keying signal carries a data train repeatedly, each data train having first data, a synchronizing word, and second data successively, said forward equalizing portion effects a forward equalizing training processing using said synchronizing word in the forward direction with respect to time passage in receiving said data train to determine said forward tap coefficients before equalizing said second data, and said backward equalizing portion effects a backward equalizing training processing using said synchronizing word in the backward direction with respect to time passage in receiving said data train to determine said backward tap coefficients before equalizing said first data.

9. A data receiving apparatus as claimed in claim 8, further comprising a correction portion for compensating a phase difference in said equalized signals from said outputting portion of said first and second equalizing portions in accordance with said predicted phase difference.

10. A data receiving apparatus as claimed in claim 1, further comprising a frequency control portion for controlling said frequency of said local oscillation frequency in accordance with said predicted phase difference.

\* \* \* \* \*